(12) United States Patent
Otsuji et al.

(10) Patent No.: US 9,067,528 B2
(45) Date of Patent: Jun. 30, 2015

(54) TRACTION CONTROL DISPLAY DEVICE FOR VEHICLE

(71) Applicant: HONDA MOTOR CO., LTD., Tokyo (JP)

(72) Inventors: Miku Otsuji, Wako (JP); Kunihiko Fukui, Wako (JP)

(73) Assignee: HONDA MOTOR CO., LTD., TOKYO (JP)

( * ) Notice: Subject to any disclaimer, the term of this patent is extended or adjusted under 35 U.S.C. 154(b) by 235 days.

(21) Appl. No.: 13/849,961

(22) Filed: Mar. 25, 2013

(65) Prior Publication Data

US 2013/0257609 A1    Oct. 3, 2013

(30) Foreign Application Priority Data

Mar. 29, 2012    (JP) ................. 2012-078163

(51) Int. Cl.
| | |
|---|---|
| *B60Q 1/00* | (2006.01) |
| *G01D 7/04* | (2006.01) |
| *B60K 37/02* | (2006.01) |
| *B62J 99/00* | (2009.01) |
| *B60K 28/16* | (2006.01) |

(52) U.S. Cl.
CPC ........... *B60Q 1/00* (2013.01); *B62J 2099/0026* (2013.01); *B62J 99/00* (2013.01); *G01D 7/04* (2013.01); *B60K 37/02* (2013.01); *B60K 2350/1064* (2013.01); *B60Y 2200/12* (2013.01); *B60K 28/16* (2013.01)

(58) Field of Classification Search
CPC .. B60Q 1/00; B60K 37/02; B60K 2350/1064; B60K 2350/206; G01D 7/04

USPC .................................................. 340/441, 459
See application file for complete search history.

(56) References Cited

U.S. PATENT DOCUMENTS

| | | | | |
|---|---|---|---|---|
| 2,697,306 | A * | 12/1954 | Muller | 446/440 |
| 5,217,087 | A * | 6/1993 | Ikegami et al. | 180/219 |
| 8,626,416 | B2 * | 1/2014 | Miki et al. | 701/85 |
| 2004/0104816 | A1* | 6/2004 | Wilson | 340/438 |
| 2006/0164229 | A1* | 7/2006 | Masters et al. | 340/461 |
| 2008/0219018 | A1* | 9/2008 | Eich | 362/489 |
| 2009/0121853 | A1* | 5/2009 | Eich et al. | 340/438 |
| 2009/0277375 | A1* | 11/2009 | Fanfa et al. | 116/288 |
| 2009/0322505 | A1* | 12/2009 | Sullivan et al. | 340/438 |
| 2010/0277495 | A1* | 11/2010 | Taguchi et al. | 345/589 |
| 2011/0193694 | A1* | 8/2011 | Bowden et al. | 340/438 |
| 2012/0143440 | A1* | 6/2012 | Yu et al. | 701/36 |

FOREIGN PATENT DOCUMENTS

JP    5-118237    5/1993

* cited by examiner

*Primary Examiner* — Benjamin C Lee
*Assistant Examiner* — Stephen Burgdorf
(74) *Attorney, Agent, or Firm* — Rankin, Hill & Clark LLP

(57) ABSTRACT

A traction control display device for a vehicle having traction control for suppressing slipping of a wheel in response to operation of an accelerator by a driver. The traction control display device includes a meter and a traction control system (TCS) indicator. The meter has a needle movable over a dial that indicates an engine rotational speed. The TCS indicator indicates that the traction control is in an activated state. The TCS indicator is disposed in a region of parts of high engine rotational speeds within a movable range of the needle within the meter.

15 Claims, 3 Drawing Sheets

TRACTION CONTROL DISPLAY DEVICE FOR VEHICLE

BACKGROUND OF THE INVENTION

1. Field of the Invention

The present invention relates to a traction control display device for use in a vehicle having traction control for suppressing the slipping of a wheel in response to operation of an accelerator by a driver.

2. Description of Related Art

As disclosed in Japanese Patent No. 2915191, for example, a motorcycle performs traction control (hereinafter referred to as a TCS) when the slip ratio of a driving wheel becomes a predetermined value or higher. Such motorcycles conventionally have a meter device provided with a TCS indicator that shows a TCS activated state when the TCS is in an activated (active) state.

This meter device has an indicator panel with various kinds of indictors arranged therein in an upper part of a meter panel and having a speedometer and a tachometer arranged therein, and the TCS indicator is disposed within the indicator panel.

SUMMARY OF THE INVENTION

In order to miniaturize the above-described meter device as a whole, the TCS indicator may be disposed within the meter. However, depending on the position at which the TCS indicator is disposed, the visibility of the TCS indicator may be desired to be improved.

Specifically, while the TCS is activated, because of control performed to control the output of an engine in response to operation of a throttle by a driver, the driver may direct eyes to the display of an engine rotational speed within the meter. However, when the indicator indicating the activation of the TCS is simply disposed within the meter, the TCS indicator may be obstructed by a needle indicating the engine rotational speed, depending on the engine rotational speed at which the TCS is activated.

The present invention has been made in view of the above situation. It is an object of the present invention to provide a traction control display device for a vehicle that can ensure excellent visibility when a TCS indicator is disposed within a meter.

In accordance with the present invention, the traction control display device includes a meter having a needle movable over a dial and indicating an engine rotational speed and a TCS indicator indicating that the traction control is in an activated state within the meter. The TCS indicator is disposed in a region of parts of high engine rotational speeds within a movable range of the needle within the meter.

In accordance with this construction, when traction control (TCS) occurs in a state of a high engine rotational speed, output control is performed to decrease the engine rotational speed. Thus, disposing the TCS indicator in a part for indicating high engine rotational speeds within the movable range of the needle enables display of the activation of the TCS while preventing the display from being obstructed by the needle indicating the engine rotational speed as much as possible. Therefore, the driver can easily recognize that TCS control is on by the engine rotational speed and the TCS indicator, moving a line of sight by only a small amount. In addition, because a need to provide a separate indicator unit is eliminated, it is possible to achieve reduction in size and reduction in cost.

In further accordance with the present invention, the meter includes a numeral section indicating the engine rotational speed in a direction of rotation of the needle and a plurality of indicator sections including the TCS indicator are arranged in substantially a shape of an arc in an inside diameter section of the numeral section. Accordingly, the inside of rotational speed display can be utilized effectively, and the indicators are made easily visible.

In further accordance with the present invention, the TCS indicator is disposed in a vicinity of a red zone indicating a vicinity of a rotational speed limit within the movable range of the needle within the meter. Because the TCS is rarely activated in the red zone of engine rotational speeds, the visibility of the TCS indicator can be improved.

In further accordance with the present invention, the TCS indicator is disposed in an upper part within the meter and further includes a TCS off indicator indicating that the traction control is off, wherein the TCS off indicator is disposed in the upper part within the meter and in proximity to the TCS indicator. Because TCS information is important information related to driving, it is more desirable from a viewpoint of visibility that the TCS indicator and the TCS off indicator be disposed in the upper part of the meter.

In further accordance with the present invention, the TCS indicator and the TCS off indicator are in proximity to each other and in a same type of color type. Further, indicators of a color type different from the color type of the TCS indicator and the TCS off indicator are disposed as indicators on a left and a right of the TCS indicator and the TCS off indicator. The TCS indicator or the TCS off indicator is easily recognized with a hue different from the indicators on the left and the right of the TCS indicator or the TCS off indicator.

In further accordance with the present invention, the traction control display device further includes an idle stop enabling indicator indicating that idle stop control is enabled. The idle stop enabling indicator is disposed in a position higher than a position indicating an idle rotational speed within the movable range of the needle within the meter. The traction control display device further includes an idle stop disabling indicator indicating that the idle stop control is disabled. The idle stop disabling indicator is disposed in a position adjacent to the idle stop enabling indicator and disposed in a position close to the idle rotational speed. The idle stop enabling indicator is disposed at a position higher than a normal idle rotational speed. Therefore the position can be prevented from being covered by the needle during idling.

In further accordance with the present invention, the idle stop enabling indicator is disposed above the idle stop disabling indicator. Therefore, the idle stop enabling indicator can be disposed in a higher position within the meter. Therefore the idle stop enabling indicator can be prevented from being covered by the needle.

In further accordance with the present invention, indicators of a red color type are disposed in proximity to an idle rotational speed indicating position of the needle within the meter. When the needle indicates the idle rotational speed within the meter, the needle can be located so as to be sandwiched between the indicators of a red color type as a conspicuous color. Therefore an idle rotation range is easily recognized.

DETAILED DESCRIPTION OF THE PREFERRED EMBODIMENTS

Figure 1:
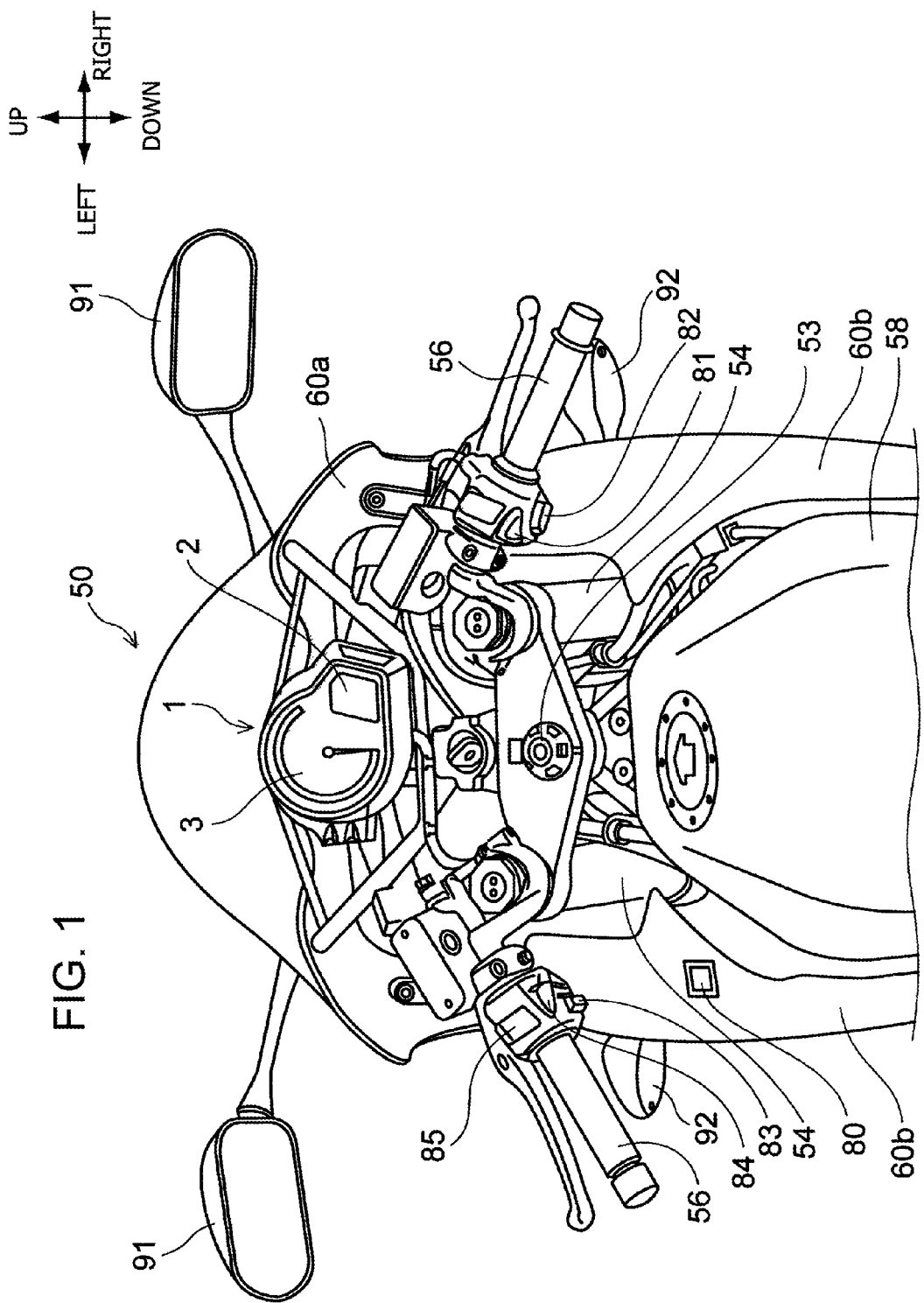
FIG. 1 is a plan view of assistance in explaining a part around a meter of a motorcycle mounted with a traction control display device for a vehicle according to the present invention as viewed from the viewpoint of an occupant.

An example of an embodiment of a traction control display device for a vehicle according to the present invention will hereinafter be described with reference to the drawings. FIG. 1 is a plan view of assistance in explaining a part around the meter of a motorcycle as viewed from the viewpoint of an occupant. The traction control display device for a vehicle according to the present invention is mounted on a handlebar part of the motorcycle (vehicle).

Traction control grasps whether or not a rear wheel as a driving wheel is slipping by a driving wheel speed sensor and a driven wheel speed sensor mounted in the motorcycle, and when slipping occurs, reduces the output of an engine by controlling the fuel injection of the engine and controlling ignition so as to suppress the slipping of the rear wheel, whereby the slipping of the rear wheel is prevented. A TCS off switch 80 for deactivating the traction control is disposed on a side cover 60b on a left side at a front position of a fuel tank 58.

A display device (meter 1) for a vehicle to which display device a structure according to the present invention is applied is mounted on a central part in a lateral direction of handlebars 55. The display device for a vehicle includes a speedometer 2 indicating the speed of the motorcycle 50, a tachometer 3 indicating the rotational speed of the engine, indicators for indicating various kinds of information on the motorcycle 50, and the like.

An N/D selector switch 81 for performing switching operation between neutral (N) and first gear (D) of an automatic transmission and a starter switch 82 for starting the engine 62 are disposed at a base position of a right grip 56 of the handlebars 55. The N/D selector switch 81 is configured as a seesaw pressing type (returns to a neutral position when a pressing force is released). A left D-side or a right N-side of the N/D selector switch 81 is pressed to perform switching operation between the neutral (N) and the first gear (D) of the automatic transmission while the motorcycle 50 is stopped. The starter switch 82 is operated to start the engine when an ignition switch is in an on state and the transmission is in a neutral state.

A turn signal switch 83 for turning on direction indicators (turn signal lamps 92), a horn switch 84 for generating a warning sound, and a dimmer switch 85 for switching between a low beam and a high beam of a headlight 61 are each disposed at a base position of a left grip 56 of the handlebars 55.

Figure 2:
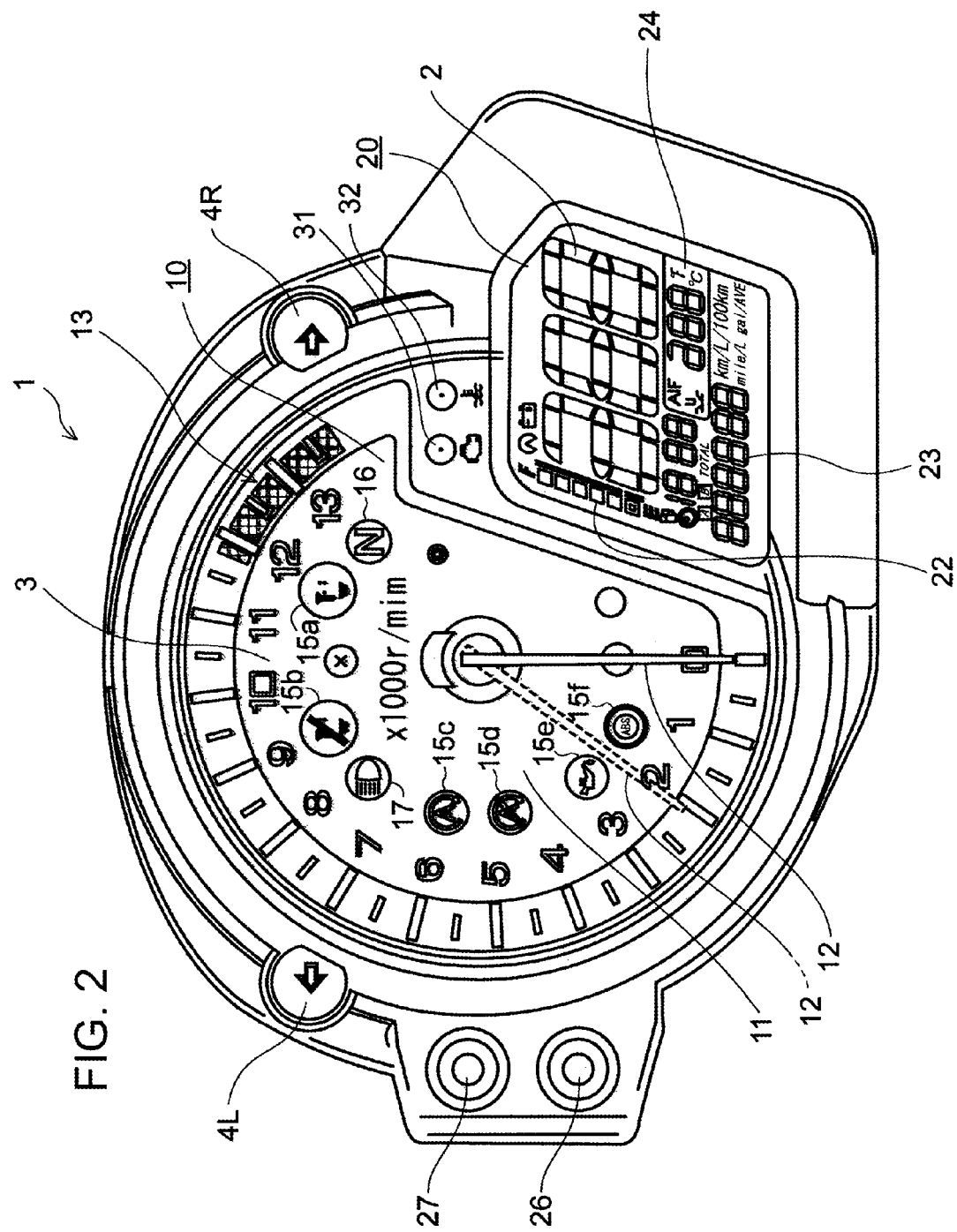
FIG. 2 is a plan view of assistance in explaining a traction control display device for a vehicle according to an embodiment of the present invention (during a stop of an engine).
Figure 3:
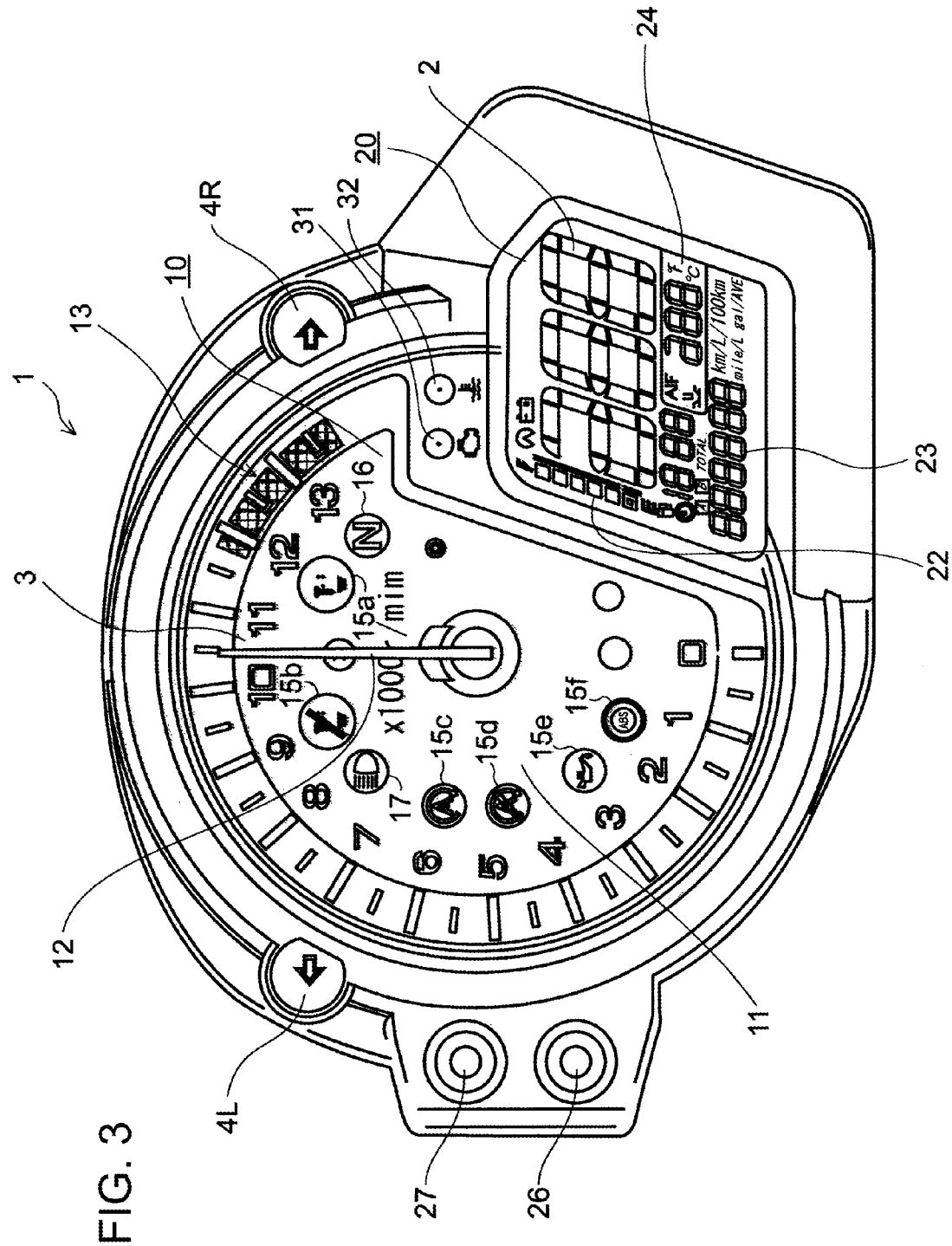
FIG. 3 is a plan view of assistance in explaining the traction control display device for a vehicle according to the embodiment of the present invention (during rotation of the engine).

A detailed constitution of the traction control display device for the vehicle will hereinafter be described with reference to FIG. 2 and FIG. 3.

The motorcycle mounted with the traction control display device for the vehicle has mechanisms for performing traction control that suppresses the slipping of the rear wheel WR as driving wheel in response to operation of an accelerator by a driver (operation of rotating the right grip 56), ABS control that detects the state of activation of brakes at the front wheel WF and the rear wheel WR and prevents the locking of the wheels, and idle stop control that detects the idling state of the engine and stops the engine.

The traction control display device for the vehicle includes an analog display section 10 located at a center within the meter 1 and a digital display section 20 located on a lower right side of the analog display section 10. Turn signal indicators 4L and 4R that blink in such a manner as to be operatively associated with the operation of the turn signal switch 83 are disposed above the left and right of outer circumferential positions of the analog display section 10.

The analog display section 10 includes a dial 11 showing characters such as numerals indicating engine rotational speeds and the like and a needle 12 movable over the dial 11 and indicating an engine rotational speed. Numerals "0," "1," "2," "3," "4," "5," "6," "7," "8," "9," "10," "11," "12," and "13" indicating engine rotational speeds (1000 rpm/min) with "0" at a position directly under the dial 11 as well as graduations corresponding to the respective numerals (numeral section) are shown clockwise (right-handed) along the circumference of the dial 11 in a range of about 240 degrees. The dial 11 and the needle 12 rotating over the dial 11 form the tachometer 3. In addition, a red zone 13 in the shape of a band which red zone indicates that the engine rotational speed is in a red zone range is shown in a position of graduations in a range of 11800 revolutions to 13800 revolutions.

The needle 12 is fixed to a shaft of a mechanical movement (not shown) disposed on the back side of the dial 11. Thereby, the shaft rotates as the engine rotational speed is increased, and the needle 12 indicates the engine rotational speed by moving over the dial 11 in a range up to a maximum of 240 degrees by an amount of rotation corresponding to the rotation of the shaft.

A TCS indicator 15a that illuminates while traction control is in an activated state is formed in the dial 11. The TCS indicator 15a is located on a central side in a direction of a radius of the character "12" of the dial. Thus, the TCS indicator 15a is disposed at a position of an upper part in the dial 11 and in the vicinity of the red zone 13 within the movable range of the needle 12, and is disposed in a region of parts of high engine rotational speeds within the movable range of the needle 12. The TCS indicator 15a is disposed in the vicinity of the red zone 13 because the TCS is rarely activated in the red zone 13 of engine rotational speeds and the TCS indicator 15a is prevented from being hidden by the needle 12. The TCS indicator 15a is configured to illuminate in orange.

A TCS off indicator 15b that illuminates while traction control is in an off state is formed at a position axisymmetric to the TCS indicator 15a with respect to a center line in the dial 11.

Because the TCS off indicator 15b is formed at the position axisymmetric to the TCS indicator 15a, the TCS off indicator 15b is disposed in the upper part within the dial 11 as with the TCS indicator 15a. The TCS off indicator 15b is configured to illuminate in orange.

The TCS indicator 15a illuminates while traction control (TCS) is performed. When traction control (TCS) occurs in a state of a high engine rotational speed (state of FIG. 3), output control is performed in a direction of decreasing the engine rotational speed. Thus, disposing the TCS indicator 15a in a part for indicating high engine rotational speeds within the movable range of the needle 12 enables display of the activation of the TCS while preventing the display from being obstructed by the needle 12 indicating the engine rotational speed as much as possible. As a result, the driver can easily recognize that TCS control is on by visually checking the engine rotational speed and the TCS indicator 15a, moving a line of sight by only a small amount. In addition, because a need to provide a separate indicator unit is eliminated, it is possible to achieve reduction in size and reduction in cost.

TCS information is important information related to driving. Thus, the TCS indicator 15a and the TCS off indicator 15b are disposed in the position of the upper part within the meter 1 and thereby made highly visible from the driver.

An idle stop enabling indicator 15c that illuminates when idle stop control is enabled is formed in the dial 11. The idle stop enabling indicator 15c is located on a central side in a direction of a radius of the character "6" of the dial, and is thus disposed at a position higher than a position (position of the numeral "2") indicating an idle rotational speed (2000 revolutions) within the movable range of the needle 12 in the dial 11.

In addition, an idle stop disabling indicator 15d that illuminates when idle stop control is disabled is formed in the dial 11. The idle stop disabling indicator 15d is disposed at a position lower than the idle stop enabling indicator 15c, and is disposed at a position higher than the position (position of the numeral "2") indicating the idle rotational speed (2000 revolutions) within the movable range of the needle 12 in the dial 11.

The idle stop enabling indicator 15c is thus disposed above the idle stop disabling indicator 15d.

The idle stop enabling indicator 15c and the idle stop disabling indicator 15d are configured to illuminate in green. The idle stop enabling indicator 15c and the idle stop disabling indicator 15d are configured to illuminate only while an idle stop is selected.

The idle stop enabling indicator 15c and the idle stop disabling indicator 15d are provided at the positions higher than the normal idle rotational speed (2000 revolutions), so that the idle stop enabling indicator 15c and the idle stop disabling indicator 15d can be prevented from being covered and hidden by the needle 12 during idling.

An oil indicator 15e (warning light) that illuminates when an amount of engine oil is reduced is formed at a position lower than the idle stop disabling indicator 15d in the dial 11. An ABS indicator 15f (caution light) that illuminates at a time of activation of an ABS is further formed on a lower side of the oil indicator 15e. The oil indicator 15e (warning light) and the ABS indicator 15f (caution light) are disposed at such positions as to sandwich the needle 12 indicating the idle rotational speed (about 2000 revolutions) (which needle 12 is shown by a dotted line in FIG. 2) (at positions adjacent to the idle rotational speed). The oil indicator 15e (warning light) is configured to illuminate in red. The ABS indicator 15f (caution light) is configured to illuminate in orange.

Therefore, when the needle indicates an idle rotational speed of about 2000 revolutions, the needle is located so as to be sandwiched between the indicators of a red color type as a conspicuous color. Thus an idle rotation range is easily recognized.

In addition, a neutral indicator 16 that illuminates when gears are placed in a neutral position by operation of the N/D selector switch 81 is formed at a position on a lower right side of the TCS indicator 15a in the dial 11. A high beam indicator 17 that illuminates when the headlight is made to emit a high beam by switching operation of the dimmer switch 85 is formed at a position on a lower left side of the TCS off indicator 15b. The neutral indicator 16 is configured to illuminate in green. The high beam indicator 17 is configured to illuminate in blue.

According to the constitution of the analog display section 10 described above, a plurality of indicator sections, which are the ABS indicator 15f, the oil indicator 15e, the idle stop disabling indicator 15d, the idle stop enabling indicator 15c, the high beam indicator 17, the TCS off indicator 15b, the TCS indicator 15a, and the neutral indicator 16, are arranged clockwise from the side of a lower part in substantially the shape of an arc in an inside diameter section of the numeral section disposed in the dial 11.

Formed in the digital display section 20 are the speedometer 2 formed by a display of a three-digit numeral, a remaining fuel amount indicator 22 formed by a bar display arranged vertically on the left side of the speedometer 2 and indicating an amount of fuel remaining within the fuel tank 58, a digital display section 23 displaying a distance traveled by the motorcycle 50, an average fuel consumption, and the like, an air temperature display section 24, and the like. As for the types of the traveled distance, the average fuel consumption, and the like displayed in the digital display section 23, a plurality of kinds of numerical values can be selected by pressing a mode selector switch 26 disposed at a position on the left side and outside of the meter 1, and a numerical value being displayed can be reset by pressing a reset switch 27. In addition, the idle stop is switched on or off by pressing the mode selector switch 26 and the reset switch 27 simultaneously.

An engine warning light 31 that illuminates at a time of an abnormality of the engine and a water temperature warning light 32 that illuminates at a time of an increase in temperature of a cooling water are formed in a region located between the analog display section 10 and the digital display section 20 within the meter 1.

According to the above-described traction control display device for the vehicle, in the case where the TCS indicator 15a and the TCS off indicator 15b indicating whether or not traction control (TCS) is present and the idle stop enabling indicator 15c and the idle stop disabling indicator 15d indicating whether or not idle stop control is present are arranged within the meter 1, the indicators are arranged at positions determined by considering relation between the respective types of control and the engine rotational speed. Thus, when the driver checks the activation of the types of control, the driver can visually check activation conditions without the indicators being obstructed by the needle 12 indicating the engine rotational speed.

DESCRIPTION OF REFERENCE SYMBOLS

1 . . . Meter, 2 . . . Speedometer, 3 . . . Tachometer, 4 . . . Turn signal indicator, 10 . . . Analog display section, 20 . . . Digital display section, 11 . . . Dial, 12 . . . Needle, 13 . . . Red zone, 15a . . . TCS indicator, 15b . . . TCS off indicator, 15c . . . Idle stop enabling indicator, 15d . . . Idle stop disabling indicator, 80 . . . TCS off switch

What is claimed is:

1. A traction control display device for a vehicle, the vehicle having traction control for suppressing slipping of a wheel in response to operation of an accelerator by a driver, the traction control display device comprising:
   a meter having a needle movable over a dial and indicating an engine rotational speed; and
   a TCS indicator indicating that the traction control is in an activated state within the meter;
   wherein the TCS indicator is disposed in a region of parts of high engine rotational speeds within a movable range of the needle within the meter,
   wherein the TCS indicator is disposed in an upper part within the meter, and
   further comprising a TCS off indicator indicating that the traction control is off,
   wherein the TCS off indicator is disposed in the upper part within the meter, wherein the TCS indicator and the TCS off indicator are in proximity to each other in a same color type, and indicators of a color type different from the color type of the TCS indicator and the TCS off indicator are disposed as indicators on a left and a right of the TCS indicator and the TCS off indicator.

2. The traction control display device for the vehicle according to claim 1,
wherein the meter includes a numeral section indicating the engine rotational speed in a direction of rotation of the needle, and a plurality of indicator sections including the TCS indicator are arranged in substantially a shape of an arc in an inside diameter section of the numeral section.

3. The traction control display device for the vehicle according to claim 1,
wherein the TCS indicator is disposed in a vicinity of a red zone indicating a vicinity of a rotational speed limit within the movable range of the needle within the meter.

4. The traction control display device for the vehicle according to claim 1,
wherein indicators of a red color type are disposed in proximity to an idle rotational speed indicating position of the needle within the meter.

5. The traction control display device for the vehicle according to claim 1, further comprising an idle stop enabling indicator indicating that idle stop control is enabled,
wherein the idle stop enabling indicator is disposed in a position higher than a position indicating an idle rotational speed within the movable range of the needle within the meter.

6. The traction control display device for the vehicle according to claim 5, further comprising an idle stop disabling indicator indicating that the idle stop control is disabled,
wherein the idle stop disabling indicator is disposed in a position adjacent to the idle stop enabling indicator and disposed in a position close to the idle rotational speed.

7. The traction control display device for the vehicle according to claim 6,
wherein the idle stop enabling indicator is disposed above the idle stop disabling indicator.

8. A traction control display device for a vehicle, the vehicle having traction control for suppressing slipping of a wheel in response to operation of an accelerator by a driver, the traction control display device comprising:
a meter having a needle movable over a dial and indicating an engine rotational speed; and
a TCS indicator indicating that the traction control is in an activated state within the meter;
wherein the TCS indicator is disposed in a region of parts of high engine rotational speeds within a movable range of the needle within the meter,
further comprising an idle stop enabling indicator indicating that idle stop control is enabled and an idle stop disabling indicator indicating that the idle stop control is disabled,
wherein the idle stop enabling indicator is disposed in a position higher than a position indicating an idle rotational speed within the movable range of the needle within the meter, and the idle stop disabling indicator is disposed in a position adjacent to the idle stop enabling indicator and disposed in a position close to the idle rotational speed.

9. The traction control display device for the vehicle according to claim 8,
wherein the idle stop enabling indicator is disposed above the idle stop disabling indicator.

10. The traction control display device for the vehicle according to claim 8,
wherein the TCS indicator is disposed in an upper part within the meter.

11. The traction control display device for the vehicle according to claim 10, further comprising a TCS off indicator indicating that the traction control is off,
wherein the TCS off indicator is disposed in the upper part within the meter and in proximity to the TCS indicator.

12. The traction control display device for the vehicle according to claim 11,
wherein the TCS indicator and the TCS off indicator are in proximity to each other in a same color type, and indicators of a color type different from the color type of the TCS indicator and the TCS off indicator are disposed as indicators on a left and a right of the TCS indicator and the TCS off indicator.

13. The traction control display device for the vehicle according to claim 8,
wherein the meter includes a numeral section indicating the engine rotational speed in a direction of rotation of the needle, and a plurality of indicator sections including the TCS indicator are arranged in substantially a shape of an arc in an inside diameter section of the numeral section.

14. The traction control display device for the vehicle according to claim 8,
wherein the TCS indicator is disposed in a vicinity of a red zone indicating a vicinity of a rotational speed limit within the movable range of the needle within the meter.

15. The traction control display device for the vehicle according to claim 8,
wherein indicators of a red color type are disposed in proximity to an idle rotational speed indicating position of the needle within the meter.

* * * * *